United States Patent
Jiang et al.

(10) Patent No.: US 11,449,313 B2
(45) Date of Patent: Sep. 20, 2022

(54) SYSTEM AND METHOD APPLIED TO INTEGRATED DEVELOPMENT ENVIRONMENT

(71) Applicant: ALIBABA GROUP HOLDING LIMITED, Grand Cayman (KY)

(72) Inventors: Long Jiang, Hangzhou (CN); Jianyi Meng, Hangzhou (CN); Chunqiang Li, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/119,626

(22) Filed: Dec. 11, 2020

(65) Prior Publication Data

US 2021/0182030 A1    Jun. 17, 2021

(30) Foreign Application Priority Data

Dec. 16, 2019 (CN) .......................... 201911291421.3

(51) Int. Cl.
*G06F 8/33* (2018.01)
*G06F 8/34* (2018.01)
(Continued)

(52) U.S. Cl.
CPC .............. *G06F 8/33* (2013.01); *G06F 3/0482* (2013.01); *G06F 3/04817* (2013.01); *G06F 8/34* (2013.01)

(58) Field of Classification Search
CPC ....... G06F 3/04847; G06F 2203/04804; G06F 3/04842; G06F 3/04845; G06F 3/0486;
(Continued)

(56) References Cited

U.S. PATENT DOCUMENTS

| 7,970,596 B2 | 6/2011 | Bade et al. |
| 8,418,130 B2 | 4/2013 | Tittizer et al. |

(Continued)

FOREIGN PATENT DOCUMENTS

| AU | 2012203306 B2 | 2/2015 |
| EP | 2420928 B1 | 5/2013 |

OTHER PUBLICATIONS

Written Opinion and International Search Report for PCT Application No. PCT/US2020/064597 dated Mar. 22, 2021.
(Continued)

*Primary Examiner* — Rayeez R Chowdhury

(57) ABSTRACT

Methods, systems, and apparatus, including computer programs encoded on computer storage media, for obtaining a network service and applicable to an integrated development environment (IDE) are provided. The IDE comprises a graphical interface comprising a toolbar and a plurality of functional areas, the plurality of functional areas comprise a code editing area for inputting and outputting source code, and the toolbar comprises an icon. One of the methods includes: receiving a user operation on the icon in the toolbar; and in response to the user operation on the icon being a preset user operation, loading a browser engine, and displaying, through the browser engine, a navigation interface corresponding to the icon in the code editing area of the graphical interface of the IDE, for a user to obtain a network service corresponding to the navigation interface.

20 Claims, 7 Drawing Sheets

(51) Int. Cl.
*G06F 3/0482* (2013.01)
*G06F 3/04817* (2022.01)

(58) Field of Classification Search
CPC .. G06F 3/0482; G06F 3/04817; G06F 16/483;
G06F 16/5866; G06F 16/81; G06F 16/86;
G06F 16/94; G06F 16/953; G06F
16/9566; G06F 16/957; G06F 16/9577;
G06F 3/0483; G06F 3/0489; G06F
40/106; G06F 40/169; G06F 40/30; G06F
16/958; G06F 2203/04803; G06F 3/0481;
G06F 8/33; G06F 8/34; G06F 9/44521
See application file for complete search history.

(56) References Cited

U.S. PATENT DOCUMENTS

| | | | |
|---|---|---|---|
| 8,434,068 B2 | 4/2013 | Wrighton et al. | |
| 8,578,282 B2 | 11/2013 | Boillot | |
| 8,782,598 B2 | 7/2014 | Chaar et al. | |
| 8,954,553 B1 | 2/2015 | Colton et al. | |
| 9,092,137 B2 | 7/2015 | Gassner et al. | |
| 9,170,784 B1 | 10/2015 | Friedman | |
| 9,684,584 B2 | 6/2017 | Bates et al. | |
| 10,204,031 B2 | 2/2019 | Assenmacher | |
| 10,268,525 B2 | 4/2019 | Beckett et al. | |
| 10,359,902 B2 | 7/2019 | Sullivan et al. | |
| 10,733,532 B2 | 8/2020 | Hammond et al. | |
| 2002/0059054 A1 | 5/2002 | Bade et al. | |
| 2005/0203764 A1 | 9/2005 | Sundararajan et al. | |
| 2005/0229154 A1* | 10/2005 | Hiew | G06F 8/34 717/110 |
| 2008/0195969 A1* | 8/2008 | Brown | G06F 3/04847 715/802 |
| 2010/0107146 A1 | 4/2010 | Wrighton et al. | |
| 2010/0217839 A1 | 8/2010 | Kawabe et al. | |
| 2012/0047130 A1* | 2/2012 | Perez | G06Q 10/00 707/723 |
| 2013/0212557 A1* | 8/2013 | Edmunds | G06F 8/75 717/109 |
| 2016/0239270 A1 | 8/2016 | Tattrie et al. | |
| 2016/0354694 A1* | 12/2016 | Isted | G06F 3/04886 |

OTHER PUBLICATIONS

Microchip Technology Inc., Microchip MPLAB X IDE User's Guide, Sep. 14, 2015, http://ww1.microchip.com/downloads/en/devicedoc/50002027d.pdf.

First Search for Chinese Application No. 201911291421.3 dated Apr. 28, 2022.

\* cited by examiner

SYSTEM AND METHOD APPLIED TO INTEGRATED DEVELOPMENT ENVIRONMENT

CROSS-REFERENCE TO RELATED APPLICATION

This application is based on and claims priority to and benefit of Chinese Patent Application No. 201911291421.3, filed with the China National Intellectual Property Administration on Dec. 16, 2019, and entitled "System and Method Applied To Integrated Development Environment." The entire content of the above-identified application is incorporated herein by reference in its entirety.

TECHNICAL FIELD

The application relates to the field of research and development, and in particular, to a system and a method applicable to an integrated development environment (IDE).

BACKGROUND

An IDE is an application program used to provide a program development environment, and integrates a series of functions such as code writing, analysis, compilation, and debugging. Any software or software suite with such a feature may be referred to as an IDE.

Visual Studio (C++ development), Eclipse (Java development), and C-SKY Development Kit (CDK, embedded development) are three popular IDEs on the market currently.

FIG. 1 shows a graphical interface 100 of Visual Studio, including a project view area 101, an information output area 102, and a code editing area 103. The code editing area 103 is used to input and output source code. The project view area 101 displays a hierarchy of each project. The information output area 102 provides information output of an IDE.

FIG. 2 shows a graphical interface 200 of Eclipse, including a project view area 201, an information output area 202, a code editing area 203, and a code navigation area 204. The code navigation area 204 displays a hierarchy of source code.

FIG. 3 shows a graphical interface 300 of CDK, which is used for chip development of C-SKY series of processors, includes a project view area 301, an information output area 302, a code editing area 303, and a code navigation area 304, and has no difference from the foregoing IDEs.

However, developers may have the needs to obtain external network services when using an IDE for development. For example, the developers need to browse developer forums, to seek answers to their questions, establish contact with authors of source code of various components in a current project, or obtain some video resources related to the current project. These requirements are not directly related to the current project, and therefore need to be met by using applications outside the IDE, resulting in inconvenience to development.

SUMMARY

The application provides a method and a system applicable to an IDE, to resolve the foregoing problem.

To achieve the objective, according to a first aspect of the application, a computer-implemented method for obtaining a network service is provided. The method is applicable to an IDE, where the IDE comprises a graphical interface comprising a toolbar and a plurality of functional areas, the plurality of functional areas comprise a code editing area for inputting and outputting source code, and the toolbar comprises a first icon. The method comprises: receiving a user operation on the first icon in the toolbar; and in response to the user operation on the first icon being a first preset user operation, loading a browser engine, and displaying, through the browser engine, a navigation interface corresponding to the first icon in the code editing area of the graphical interface of the IDE, for a user to obtain a network service corresponding to the navigation interface.

In some embodiments, the toolbar comprises a second icon, and the method further comprises: receiving a user operation on the second icon; and in response the user operation on the second icon being a second preset user operation, displaying or hiding the toolbar.

In some embodiments, the method further comprises: enabling the user to construct another navigation interface and modify the another navigation interface in real-time.

In some embodiments, the code editing area is located in a central position of the graphical interface.

In some embodiments, displaying or hiding the toolbar comprises: displaying the toolbar on top of, or to the left or right of the code editing area, and next to the code editing area.

In some embodiments, displaying or hiding the toolbar comprises: causing the toolbar to float within the code editing area.

In some embodiments, the toolbar comprises a plurality of first icons, for the user to obtain a plurality of network services through a plurality of navigation interfaces.

In some embodiments, the plurality of network services comprise: a local DingTalk service; a navigation and playing service of a video resource related to a current project; a download service for a development resource used in the current project; a service for publishing and uploading a code file of the current project to a server; a navigation service for a problem list and a forum that are related to the current project; a navigation service for a developer group related to the current project; or a combination thereof.

In some embodiments, the method further comprises: customizing the first icon comprised in the toolbar and the network service corresponding to the first icon by using configuration information.

In some embodiments, the user operation on the first icon comprises: a click operation of a mouse; a touch operation on a touchscreen; or a keystroke operation on a keyboard.

According to a second aspect, embodiments of the application provides an apparatus for obtaining a network service. The apparatus is applicable to an IDE, where the IDE comprises a graphical interface comprising a toolbar and a plurality of functional areas, the plurality of functional areas comprise a code editing area for inputting and outputting source code, the toolbar comprises a first icon. The apparatus includes: one or more processors and one or more non-transitory computer-readable memories coupled to the one or more processors and configured with instructions executable by the one or more processors to cause the apparatus to perform operations comprising: receiving a user operation on the first icon in the toolbar; and in response to the user operation on the first icon being a first preset user operation, loading a browser engine, and displaying, through the browser engine, the navigation interface corresponding to the first icon in the code editing area of the graphical interface of the IDE, for a user to obtain a network service corresponding to the navigation interface.

According to a third aspect, embodiments of the application provides a non-transitory computer-readable storage medium, applicable to an IDE, where the IDE comprises a graphical interface comprising a toolbar and a plurality of functional areas, the plurality of functional areas comprise a code editing area for inputting and outputting source code, and the toolbar comprises an icon. The non-transitory computer-readable storage medium is configured with instructions executable by one or more processors to cause the one or more processors to perform operations comprising: receiving a user operation on the icon in the toolbar; and in response to the user operation on the icon being a preset user operation, loading a browser engine; and displaying, through the browser engine, a navigation interface corresponding to the icon in the code editing area of the graphical interface of the IDE, for a user to obtain a network service corresponding to the navigation interface.

According to the methods, apparatus, and non-transitory computer-readable storage medium provided in the embodiments, a first graphical interface of an IDE is provided with a first toolbar, the first toolbar is provided with one or more first icons, and each first icon corresponds to one network service, to centrally manage some network services not closely related to a current project, thereby facilitating operations of a developer. In addition, when a user operation received on the first icon is the same as a preset user operation, a navigation interface corresponding to the first icon is displayed in a code editing area of the first graphical interface. The code editing area is an important functional area in the first graphical interface. Displaying the navigation interface in the code editing area helps a developer focus on a network service to be obtained.

BRIEF DESCRIPTION OF THE DRAWINGS

The foregoing and other objectives, features, and advantages of the application will be clearer based on the descriptions of the embodiments of the application made with reference to the accompanying drawings below. In the accompanying drawings.

DETAILED DESCRIPTION

The application is described below based on embodiments, but the application is not merely limited to the embodiments. Some details are described in the following detailed descriptions of the application. For a person skilled in the art, the application can also be completely understood without the detailed descriptions. To avoid the essence of the application from being confused with, well-known methods, procedures, and processes are not described in detail. In addition, the accompanying drawings are not necessarily drawn to scale.

Although terms such as first, second, third, and the like may be used in the specification to describe various objects, the objects should not be limited to these terms. These terms are used to distinguish a same type of objects from each other. For example, without departing from the scope of the specification, a first icon may also be referred to as a second icon; and similarly, a second icon may also be referred to as a first icon. Depending on the context, the word "if" as used herein may be interpreted as "at the time when," "when," or "in response to determination."

Figure 4:
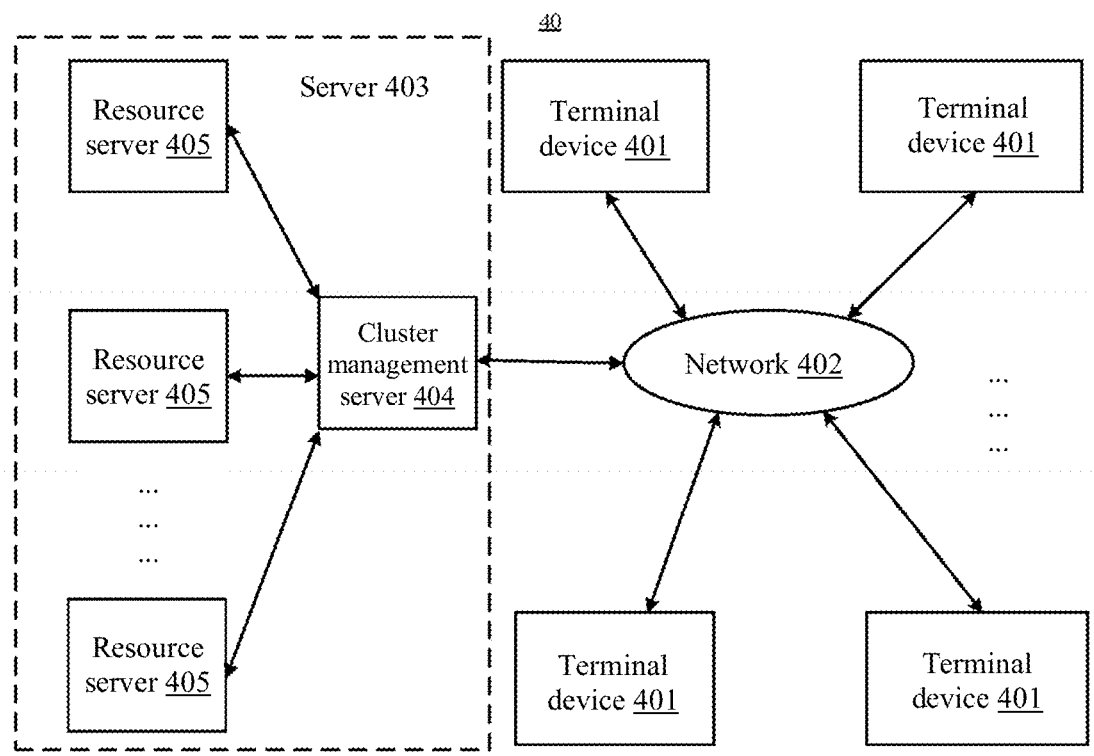
FIG. 4 is a diagram of an application scenario, according to an embodiment of the application.

FIG. 4 is a diagram of an application scenario, according to an embodiment of the application. As shown in FIG. 4, a system 40 may include a plurality of terminal devices 401 and a server 403 that are coupled through a network 402.

Each terminal device 401 may be constructed based on various models of processors currently on the market, and include various types of devices such as a memory and an input/output device. Various operating systems and various application software are installed on the terminal device 401. The operating system is, for example, a WINDOWS™ operating system, a UNIX operating system, a Linux operating system, or a real-time operating system (RTOS). The application software is, for example, a browser, video player software, communications software, and various research and development tools.

The terminal device 401 may communicate with the network 402 in various manners. The network 402 may be based on one of various communications technologies or a combination of a plurality of types of communications technologies implemented by using exchanging signals, including but not limited to, a wired technology using an electrical and/or optical conductive cable, and a wireless technology using infrared or radio frequency, and/or wireless technologies in other forms. In different application scenarios, the network 402 may be the Internet, a wide area network, or a local area network. For example, the network 402 is a proprietary network of a company. Alternatively, the network 402 may be a wired network or a wireless network.

Each terminal device 401 may download various network resources from the server 403 through the network 402. For example, the server 403 is a computer cluster, configured to provide a network service, and includes a cluster management server 404 and a plurality of resource servers 405. The cluster management server 404 is deployed with cluster management software, for the entire computer cluster to provide a network service for an external system through a unified interface. The plurality of resource servers 405 are deployed with a service program and a network resource that are used to provide a network service.

The various terminal devices 401 are further deployed with IDE software, to facilitate development of a developer. The IDE software may be pre-installed on the terminal device, or downloaded by the developer from the server 403 to the terminal device 401. Each terminal device 401 may be a device that enables development by a developer, such as a PC, a desktop computer, a notebook computer, or a palmtop computer. A user sends a service request to the server 403 by using the IDE software. The server receives the request, and forwards the request to one of the resource servers 405. The resource server 405 processes the request.

In some embodiments, the IDE software may be a software IDE such as Visual Studio or Eclipse, or may be an embedded IDE related to hardware development such as CDK. In addition, although the IDE software is deployed on the terminal device 401 in some embodiments, the IDE software may alternatively be deployed on the server 403, and a developer accesses the IDE software based on a browser, that is, the IDE software becomes a web application. In this event, the IDE software maintains a development environment on the server for each developer. The developer performs development in the corresponding development environment. Various materials are stored in the corresponding development environment in real-time. In other alternative embodiments, some functions of the IDE software may be deployed on the server 403, while some other functions may be deployed on the terminal device 401.

Further, there may be no functional difference between the computer cluster and a single server. Therefore, in some embodiments, the server 404 may alternatively be set as a single server. That is, the single server provides one or more network services.

Figure 5:
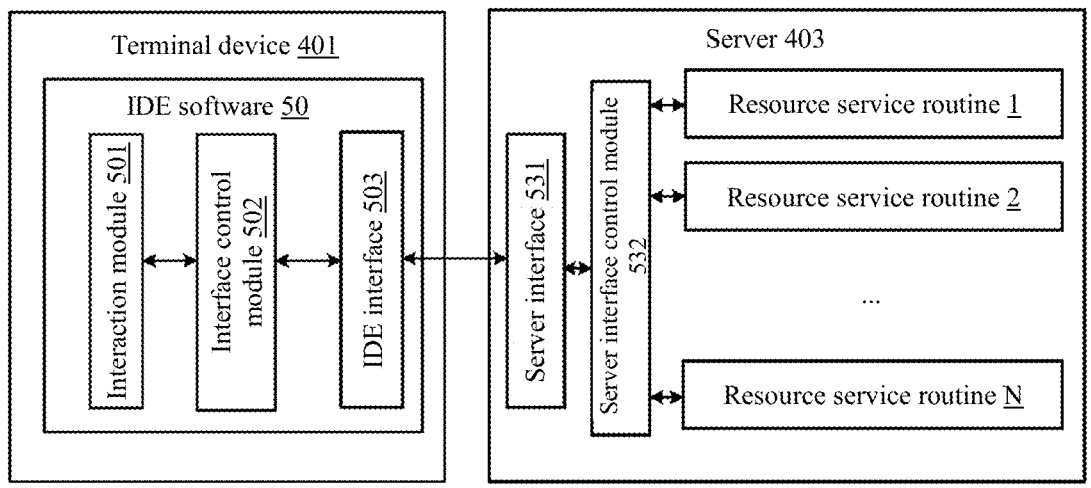
FIG. 5 is a schematic exploded diagram of deployment of various modules on a terminal device and a server shown in FIG. 4, according to an embodiment of the application.

FIG. 5 is a schematic exploded diagram of deployment of various modules on the terminal device and the server shown in FIG. 4, according to an embodiment of the application.

As shown in FIG. 5, the terminal device 401 is deployed with IDE software 50, and the IDE software 50 includes an interaction module 501, an interface control module 502, and an IDE interface 503. the application In some embodiments, the IDE software 50 includes the interaction module 501 and the interface control module 502, but not the IDE interface 503.

The interaction module 501 provides a developer with various graphical interfaces, where a first graphical interface is the main interface for a user to implement development. The first graphical interface may include a first toolbar and a plurality of functional areas. The plurality of functional areas include a code editing area used to input and output source code. The first toolbar is provided with one or more first icons. The interaction module 501 may further receive a user operation on the first icon. The user operation may be conducted by a user on the first graphical interface. In some embodiments, the interaction module 501 may determine a user operation type of the received user operation, and send the operation type to the interface control module 502.

The interface control module 502 may determine whether the user operation on the first icon is a preset user operation, and if the user operation on the first icon is a preset user operation, display a navigation interface corresponding to the first icon in the code editing area, for the user to obtain a network service corresponding to the navigation interface through the navigation interface. In some embodiments, the interface control module 502 may compare the received user operation type with a pre-stored user operation type, to determine whether the user operation on the first icon is a preset user operation.

The IDE interface 503 is configured to provide an interface for interaction with the server 403, including establishing a communication connection, sending an access request, receiving a request result, downloading a network resource, or the like. For example, after the navigation interface is provided for a developer, the developer may send various service requests through the navigation interface. Some service requests may be sent to the server 403 through the IDE interface 503. Some requests do not use a server-side service corresponding to the IDE software. Therefore, such requests do not need to be sent to the server 403 through the IDE interface 503. For example, opening a DingTalk system in the IDE software uses a server of DingTalk, instead of the server 403 in communication with the IDE software.

Still referring to FIG. 5, the server 403 is deployed with a server interface 531, a server interface control module 532, and resource service routines 1-N. The server interface 531 is configured to provide various interface services for interaction with the IDE software, to implement communication with the IDE interface 503. The server interface 531 includes various interfaces that interact with the IDE interface 503, for example, an interface that receives various service requests, forwards the service requests to the server interface control module 532, and returns a processing result to the IDE interface 503. There may be multiple server interfaces 531. The server interface control module 532 calls a server interface 531, and forwards, according to a received request, the request to one of the resource service routines 1-N for processing. The resource service routines 1-N are service routines that actually provide various network services. In some embodiments, the server interface control module 532 includes a correspondence between a request type and a resource service routine, for the server interface control module 532 to accordingly determine to forward a request to a corresponding service routine for processing.

In some embodiments, a first graphical interface of IDE software is provided with a first toolbar, the first toolbar is provided with one or more first icons, and each first icon corresponds to one network service, to centrally manage some network services not closely related to a current project, thereby facilitating operations of a developer. In addition, when a user operation received on the first icon is the same as a preset user operation, a navigation interface corresponding to the first icon is displayed in a code editing area of the first graphical interface. The code editing area is an important functional area in the first graphical interface. Displaying the navigation interface in the code editing area helps a developer focus on a network service to be obtained.

In some embodiments, the network service may be provided by a plurality of resource service routines 1-N deployed on the server 403. However, the application is not limited thereto. It is also acceptable to provide various different network services by independent and dispersed servers. Generally, network services not closely related to the current project are provided by the independent and dispersed servers. The core idea of the application is to effectively organize these network services in an IDE.

In some embodiments, the first graphical interface is further provided with a second icon, and the interaction module 501 is further configured to: receive a user operation on the second icon. In this event, the interface control module 502 is further configured to receive the user operation on the second icon from the interaction module 501, and display or hide the first toolbar when the user operation on the second icon is a preset user operation.

In some embodiments, the navigation interface corresponding to the first icon is a web page, and when a developer performs an operation on the first icon, the interface control module 502 loads a browser engine, and displays the navigation interface corresponding to the first icon in the code editing area through the browser engine. The browser engine graphically presents the navigation interface by using a browser front-end technology, for better presentation. The web page may be a page provided by a corresponding network service. For example, if a developer forum is to be used, the browser engine loads a home page of the developer forum. The web page may alternatively be a new web page created by using code in the IDE software.

For example, a developer may gather desired knowledge websites, and write source code in the IDE software, to construct a web navigation interface. In this way, the developer can favorably modify the navigation interface in real time as required. The web page may alternatively be a dynamic web page including JavaScript (JS) source code, or may be a static page. In a process of loading the browser engine and parsing the web page through the browser engine, the browser engine may perform data communication with the IDE software. Usually, the IDE software starts a local server. The browser engine communicates with a local server of the IDE software through network access (http/https), to obtain data provided by the local server. The local server may directly call a related function in the IDE software. Other embodiments are possible to implement an interaction function between the browser and the IDE software.

In some embodiments, the navigation interface corresponding to the first icon is a graphical user interface (GUI). The GUI may be an original interface of the IDE software. Displaying a navigation interface is: displaying content included in the navigation interface in the original GUI.

In other embodiments, although the navigation interface corresponding to the first icon may also be a GUI, the GUI is a new GUI interface constructed by using a GUI library provided in the IDE software. The new GUI interface has the same area as the code editing area. Therefore, displaying a navigation interface is: displaying a new GUI interface on top of the code editing area or overlaying the new navigation GUI upon the code editing area, i.e., the new GUI interface has the same display location as the code editing area, to cover the code editing area.

Although the foregoing modules are obtained through division at a software level, a person skilled in the art can appreciate a module combination different from the foregoing one, based on the guiding spirit of the application. The module combination obtained accordingly should also fall within the protection scope of the application.

FIG. 6a to FIG. 6d are each a schematic diagram of a prototype of a first graphical interface of IDE software, according to an embodiment of the application.

Figure 1:
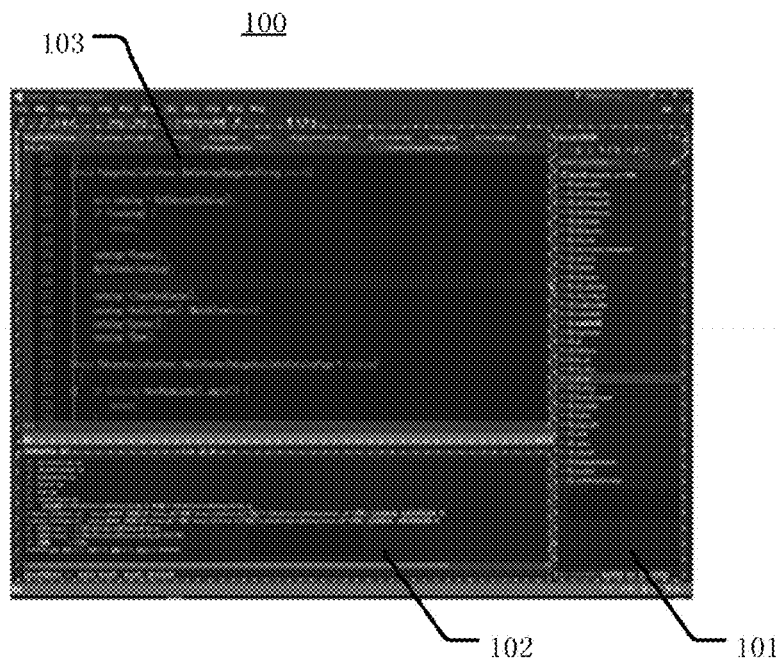
FIG. 1 is a schematic diagram of a graphical interface of Visual Studio.
Figure 2:
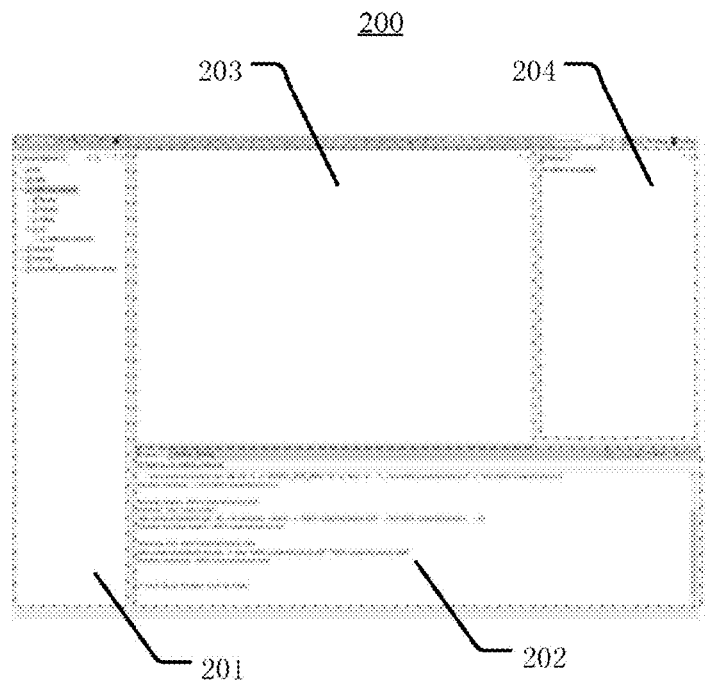
FIG. 2 is a schematic diagram of a graphical interface of Eclipse.
Figure 3:
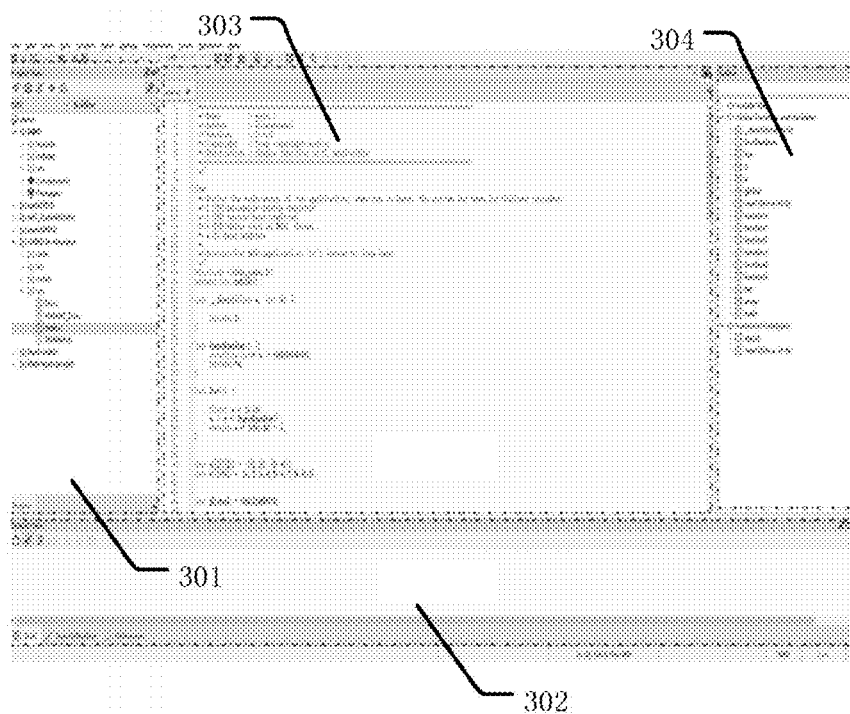
FIG. 3 is a schematic diagram of a graphical interface of CDK.
Figure 6A:
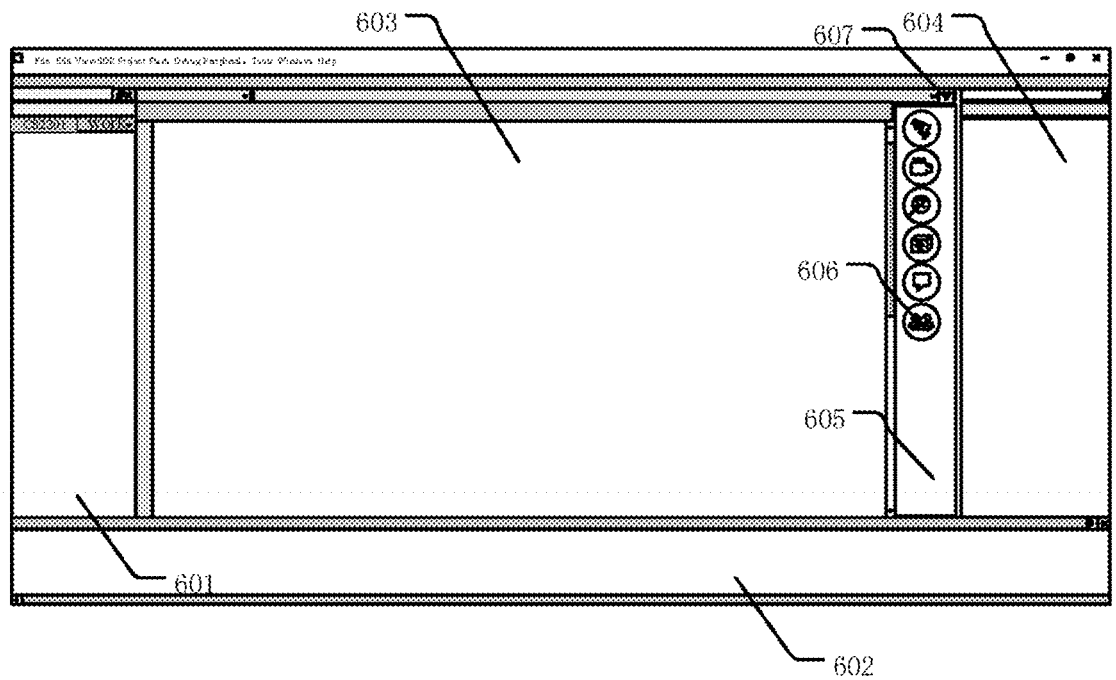
FIG. 6a to FIG. 6d are each a schematic diagram of a prototype of a first graphical interface of IDE software, according to an embodiment of the application.

Referring to FIG. 6a, a graphical interface 60 of the IDE software is divided into a plurality of functional areas, including a project view area 601, an information output area 602, a code editing area 603, and a code navigation area 604. For descriptions of the functional areas, refer to the descriptions of FIG. 1 to FIG. 3 provided above. Details are not described herein again. A first toolbar 605 is next to the code editing area 603, and is disposed to the right of the code editing area 603. The first toolbar 605 includes a plurality of first icons 606, and each first icon may represent a different network service. As shown in the figure, six icons are included. A first icon is used to open local DingTalk software, and locate a software maintainer of a project being developed. A second icon is used to present, in the code editing area, a video resource related to the project being developed. A third icon is used to present, in the code editing area, a download list of development resources used in the current project. A fourth icon is used to open a browser in the code editing area, to assist a user in uploading an IDE project that has been developed currently, and publishing the IDE project on a corresponding network platform. A fifth icon is used to open Q&A or forums related to the project being developed. A sixth icon is used to enable network resources of a developer group of the project being developed. In other embodiments, any number of first icons representing any number of network services can be included. In addition, the graphical interface 60 of the IDE software may further include a second icon 607, disposed at a location between a topmost menu and the code editing area 603. The application is not limited thereto and other locations of the second icon 607 is possible. The second icon 607 is used to hide the first toolbar 605. For example, an interface control module 502 displays or hides the first toolbar when determining that a user operation on the second icon is a preset user operation. The preset user operation may be one of the following operations: a click operation of clicking or double-clicking with a mouse when a cursor stays on the first icon; a touch operation of a touch through a touchscreen when the cursor stays on the first icon; and a keystroke operation of a stroke of a key when the cursor stays on the first icon.

Figure 6B:
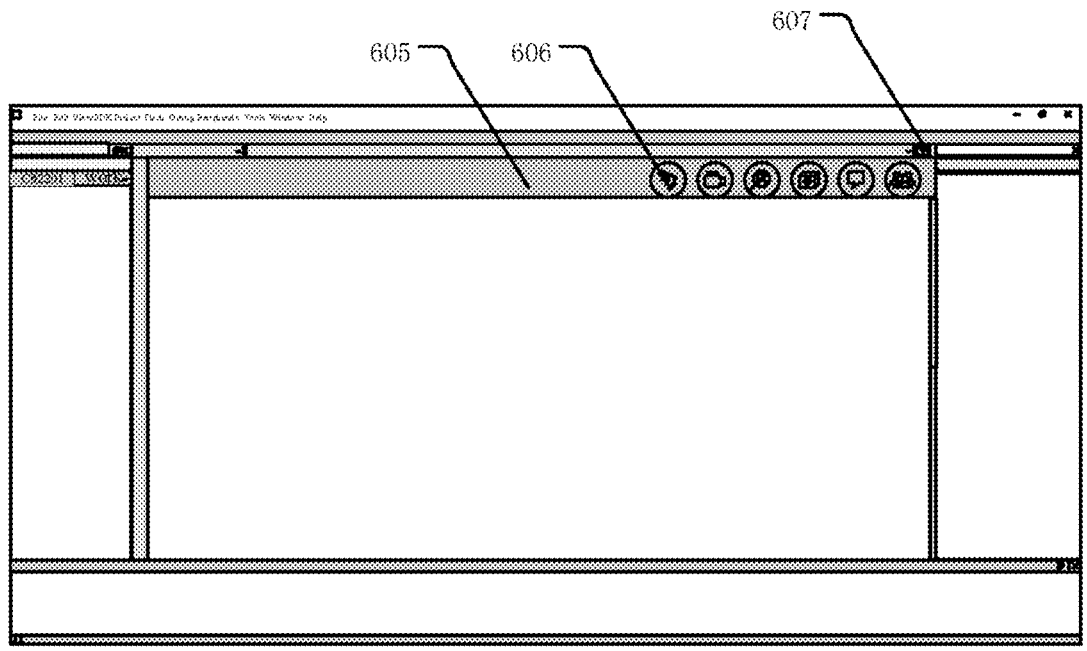

Referring to FIG. 6b, a difference from FIG. 6a lies in that, the first toolbar 605 is next to the code editing area 603 but is disposed on top of the code editing area 603. The second icon 607 is used for the same purpose as above described.

Figure 6C:
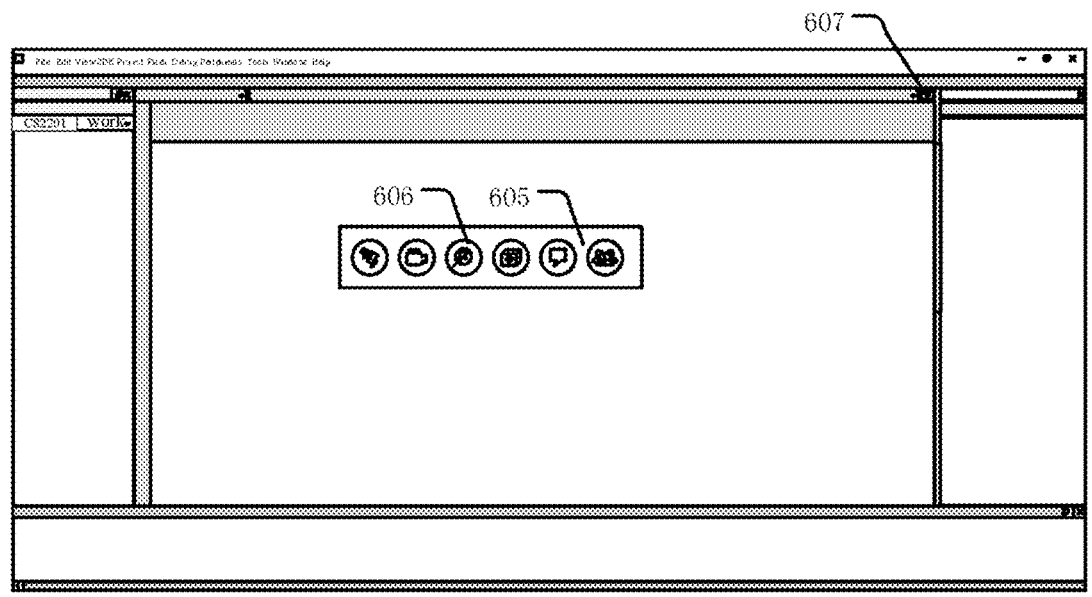

Referring to FIG. 6c, a difference from FIG. 6a lies in that, the first toolbar 605 floats within the code editing area 603. The second icon 607 is used for the same purpose as above described.

Figure 6D:
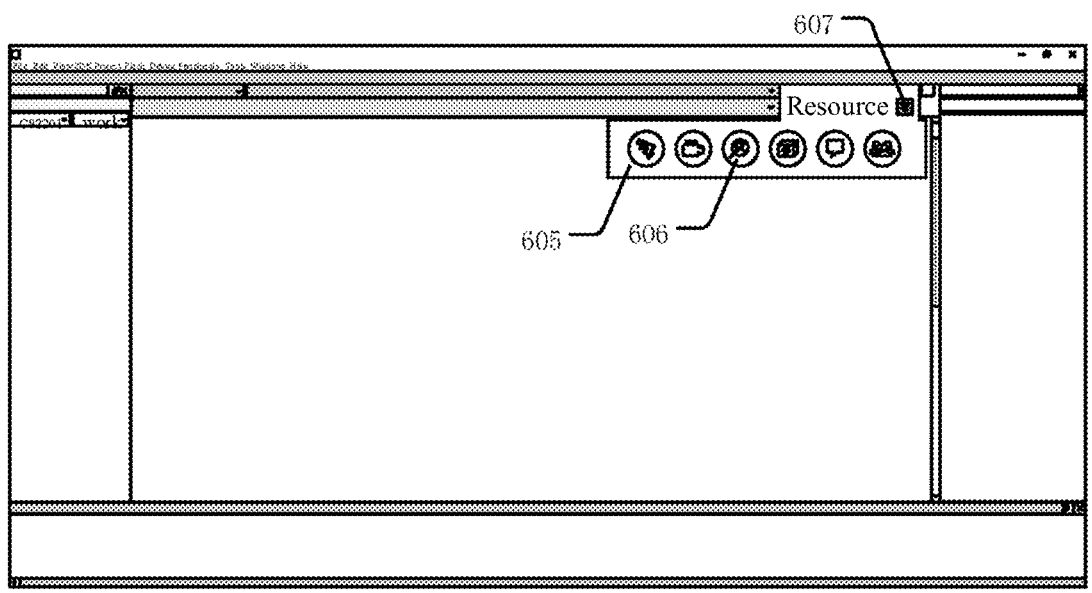

Referring to FIG. 6d, a difference from FIG. 6a lies in that, the first toolbar 605 is displayed when the cursor stays on the second icon 607, and the first toolbar 605 is hidden when the cursor leaves the second icon 607. The second icon 607 is used for the same purpose as above described.

A person skilled in the art can construct embodiment variants of the foregoing graphical interface, based on the technical essence of the embodiments of the application. These embodiment variants also fall within the protection scope of the application.

In the graphical interface of the IDE software, a quantity of first icons in the first toolbar and a network service corresponding to each first icon may be adjusted according to actual requirements. In addition, the first toolbar may be customized in the IDE software by using configuration information, including the quantity of first icons included in the first toolbar, a network service corresponding to each first icon, an arrangement order of a plurality of first icons, or the like. The configuration information may be stored in a configuration file or a database table. A developer may modify the configuration information at any time as desired. In this way, a different desire of each developer for a network service is met. In some embodiments, a configuration interface may further be provided in the IDE software, for editing the configuration information.

Figure 7:
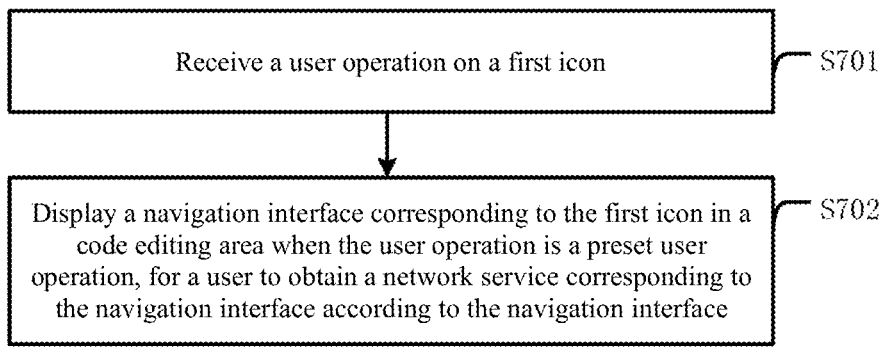
FIG. 7 is a flowchart of a method applicable to an IDE, according to an embodiment of the application.

FIG. 7 is a flowchart of a method applicable to an IDE, according to an embodiment of the application. The IDE includes a first graphical interface. The first graphical interface includes a first toolbar and a plurality of functional areas. The plurality of functional areas include a code editing area used to input and output source code. The first toolbar is provided with a first icon.

At Step S701: a user operation on the first icon is received.

At Step S702: a navigation interface corresponding to the first icon is displayed in the code editing area when the user operation is a preset user operation, for a user to obtain a network service corresponding to the navigation interface according to the navigation interface.

For example, a developer may perform, on the first icon, one of the following user operations: a click operation of a mouse, for example, left clicking the mouse, right double-clicking the mouse, or the like, when a cursor stays on the first icon; a touch operation on a touchscreen, for example, performing the touch operation when the cursor stays on the first icon; and a keystroke operation on a keyboard, for example, pressing a function key when the cursor stays on the first icon. After receiving the user operation, IDE software compares the user operation with a preset user operation. If the user operation is the same as the preset user operation, the navigation interface corresponding to the first icon is displayed in the code editing area of the first graphical interface of the IDE software. A navigation interface of each network service may be a static web page of a web application. The browser engine may download and display the navigation interface. If the navigation interface is a dynamic web page, the browser engine parses a JS script in the navigation interface and then displays the navigation interface. In addition to the web page, the navigation interface may also be a GUI interface. Because IDE software provides a GUI interface, displaying a navigation interface in the code editing area may include displaying corresponding content in a code editing area of the GUI interface of the IDE software.

According to the method provided in this embodiment, a navigation interface is displayed in a code editing area. Because the code editing area is located in a central position of a first graphical interface, a developer can achieve a good view. In this way, the developer can focus on a network service to be obtained.

Figure 8:
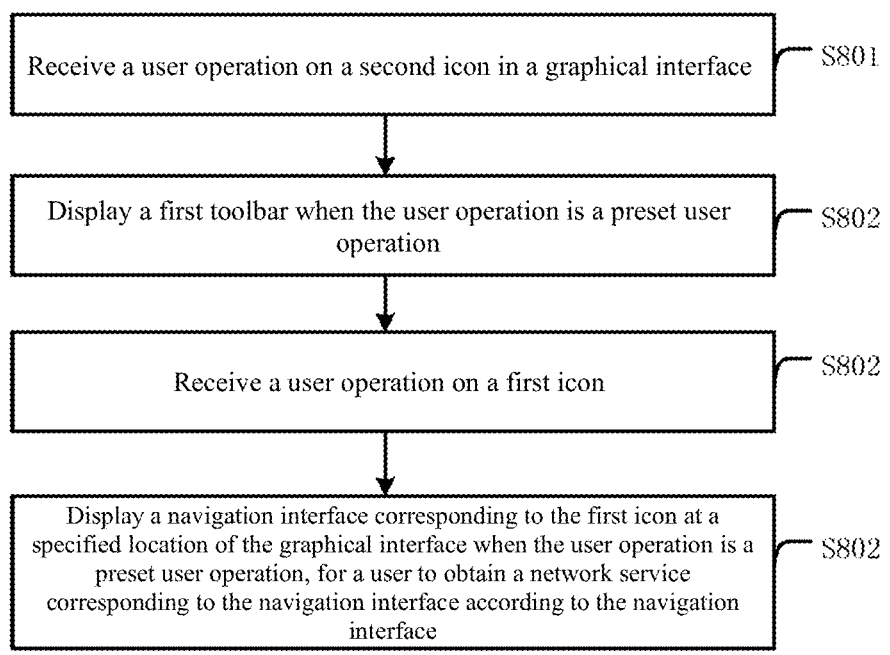
FIG. 8 is a flowchart of a method applicable to an IDE, according to another embodiment of the application.

FIG. 8 is a flowchart of a method applicable to an IDE, according to another embodiment of the application. The IDE includes a first graphical interface. The first graphical interface includes a first toolbar and a plurality of functional areas. The plurality of functional areas include a code editing area used to input and output source code. The first toolbar is provided with a first icon. The first graphical interface is further provided with a second icon. The method includes the following steps.

Step S801: Receiving a user operation on the second icon in the graphical interface.

Step S802: Displaying the first toolbar when the user operation is a preset user operation.

Step S803: Receiving a user operation on the first icon.

Step S804: Displaying a navigation interface corresponding to the first icon at a specified location in the graphical interface when the user operation is a preset user operation, for a user to obtain a corresponding network service through the navigation interface. For example, the navigation interface is displayed in the code editing area.

A developer may perform, on the second icon, one of the following user operations: a click operation of a mouse, for example, left clicking the mouse, right double-clicking the mouse, or the like, when a cursor stays on the second icon; a touch operation on a touchscreen, for example, performing the touch operation when the cursor stays on the second icon; and a keystroke operation on a keyboard, for example, pressing a function key when the cursor stays on the second icon.

According to this embodiment, when obtaining a network service, a developer clicks the second icon, to display the first toolbar. The first toolbar is provided with a plurality of first icons. Each first icon corresponds to one network service. Then, the developer may click one of the first icons, to display a navigation interface of a corresponding network service in the code editing area in the first graphical interface of the IDE, to obtain the network service through the navigation interface. When a developer is to obtain a network service, the first toolbar is displayed, and the network service is obtained through the navigation interface. When a developer is not to obtain any network service, the first toolbar is hidden, for the developer to focus on current development.

In some embodiments, in the graphical interface of the IDE software, when a system sequentially receives user operations on a plurality of first icons, a navigation interface corresponding to a previous first icon may be displayed as a thumbnail in the graphical interface.

In other embodiments, in the graphical interface of the IDE software, when a system sequentially receives user operations on a plurality of first icons, a navigation interface corresponding to a previous first icon may be replaced by a navigation interface corresponding to a next first icon.

Figure 9:
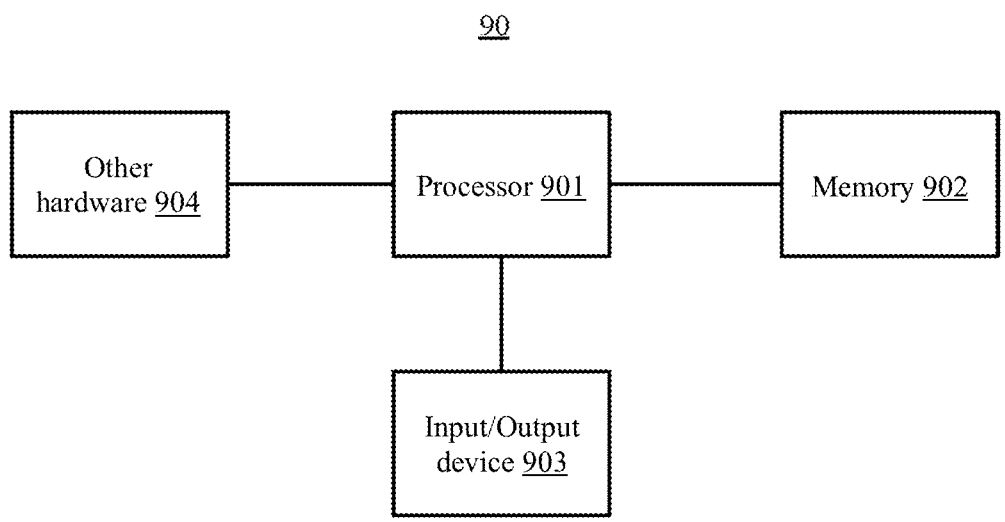
FIG. 9 is a schematic diagram of a terminal device, according to an embodiment of the application.

Corresponding to the foregoing embodiments, as shown in FIG. 9, the application further provides a terminal device 90. On a hardware level, the terminal device includes a memory 902 and a processor 901, and further includes an input/output device 903 and other hardware 904 in some events. The memory 902 may be, for example, a random access memory (RAM), or may be a non-volatile memory, for example, at least one magnetic disk memory. The input/output device 903 may be a device such as a display, a keyboard, a mouse, or a network controller. The processor 901 may be constructed based on various types of processors in the current market. The processor 901, the memory 902, the input/output device 903, and other hardware 904 are connected by using a bus. The bus may be an industry standard architecture (ISA) bus, a peripheral component interconnect (PCI) bus, an extended industry standard architecture (EISA) bus, or the like. The bus may be classified as an address bus, a data bus, a control bus, or the like. To facilitate representation, the bus is represented by using only one line in FIG. 9, but it does not indicate that there is only one bus or one type of bus.

The memory 902 is configured to store programs. Specifically, the programs may include program code, and the program code includes computer instructions. The memory may include an internal memory and a non-volatile memory, and provide computer instructions and data to the processor 901. The processor 901 reads a corresponding computer program from the memory 902 into the internal memory for running, forms the foregoing interaction methods applicable to an IDE on a logical level, and is configured to perform the following operations: receiving a user operation on the first icon; and displaying a navigation interface corresponding to the first icon in the code editing area when the user operation is a preset user operation, for a user to obtain a network service corresponding to the navigation interface according to the navigation interface.

A person skilled in the art can understand that the application may be implemented as systems, methods, and computer program products. Therefore, the application may be implemented in the following forms, that is, the form of complete hardware, complete software (including firmware, resident software, and micro code), or may be implemented in the form of a combination of software and hardware. In addition, in some embodiments, the application may further be implemented in the form of one or more computer program products in a computer-readable medium. The computer-readable medium contains computer-readable program code.

Any combination of one or more computer-readable media may be used. The computer-readable medium may be a computer-readable signal medium or a computer-readable storage medium. The computer-readable storage medium may be, for example, but is not limited to, an electric, magnetic, optical, electromagnetic, infrared, or semi-conductive system, apparatus, or device, or any other combination thereof. A more detailed example of the computer-readable storage medium may include: an electrical connection having one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any appropriate combination thereof. In this specification, the computer-readable storage medium may be any tangible medium containing or storing programs, and the programs may be used by or used in combination with processing units, apparatus, or devices.

The computer-readable signal medium may include a data signal in a baseband or propagated as a part of a carrier, the data signal carrying computer-readable program code. The propagated data signal may be in a plurality of forms, including, but not limited to, an electromagnetic signal, an optical signal, or any other appropriate combination thereof. The computer-readable signal medium may be further any computer-readable medium in addition to a computer-readable storage medium. The computer-readable medium may send, propagate, or transmit programs used by or used in conjunction with instruction systems, apparatus, or devices.

The program code included in the computer-readable medium may be transmitted by using any suitable medium, including but not limited to, wireless transmission, a wire, a cable, radio frequency (RF) or the like, or any other suitable combination thereof.

The computer program code used for executing the embodiments of the application may be written by using one or more programming languages or a combination thereof. The programming languages include an object-oriented programming language such as Java and C++, and may also include a conventional procedural programming language such as C. The program code may be executed entirely on a computer of a user, partly on the computer of the user, as a stand-alone software package, partly on the computer of the user and partly on a remote computer, or entirely on the remote computer or a server. In the event involving a remote computer, the remote computer may be connected to a computer of a user through any type of network including a local area network (LAN) or a wide area network (WAN), or may be connected to an external computer (for example, through the Internet by using an Internet service provider).

The foregoing descriptions are merely embodiments of the application, but are not intended to limit the application. For a person skilled in the art, various modifications and variations can be made on the application. Any modification, equivalent replacement, or improvement made within the spirit and principle of the application shall fall within the protection scope of the application.

What is claimed is:

1. A computer-implemented method for obtaining a network service, applicable to an integrated development environment (IDE), wherein the IDE comprises a graphical interface comprising a toolbar and a plurality of functional areas, the plurality of functional areas comprise a code editing area for inputting and outputting source code, the toolbar comprises a first icon, and the method comprises:
   receiving a user operation on the first icon in the toolbar;
   loading a browser engine;
   obtaining, through the browser engine, data from a local server, wherein the local server is started by the IDE and is capable of directly calling a function of the IDE, and the data comprises code from a user that specifies a list of websites;
   constructing, through the browser engine based on the obtained data, a web navigation interface comprising the list of websites; and
   displaying, through the browser engine, the web navigation interface in the code editing area of the graphical user interface (GUI) of the IDE, wherein the displaying comprises:
   constructing a new GUI on top of the code editing area by using a GUI library provided in the IDE, wherein the new GUI has a same display location as the code editing area and covers the code editing area; and
   displaying the web navigation interface in the new GUI.

2. The method according to claim 1, wherein the toolbar comprises a second icon, and the method further comprises:
   receiving a user operation on the second icon; and
   displaying or hiding the toolbar.

3. The method according to claim 1, further comprising: enabling the user to construct another navigation interface and modify the another navigation interface in real-time.

4. The method according to claim 1, wherein the code editing area is located in a central position of the graphical interface.

5. The method according to claim 1, wherein displaying or hiding the toolbar comprises:
   displaying the toolbar on top of, or to the left or right of the code editing area, and next to the code editing area.

6. The method according to claim 1, wherein displaying or hiding the toolbar comprises:
   causing the toolbar to float within the code editing area.

7. The method according to claim 1, wherein the toolbar comprises a plurality of first icons, for the user to obtain a plurality of network services through a plurality of navigation interfaces.

8. The method according to claim 7, wherein the plurality of network services comprise:
   a local DingTalk service;
   a navigation and playing service of a video resource related to a current project;
   a download service for a development resource used in the current project;
   a service for publishing and uploading a code file of the current project to a server;
   a navigation service for a problem list and a forum that are related to the current project;
   a navigation service for a developer group related to the current project; or
   a combination thereof.

9. The method according to claim 1, further comprising: customizing the first icon comprised in the toolbar and the network service corresponding to the first icon by using configuration information.

10. The method according to claim 1, wherein the user operation on the first icon comprises:
    a click operation of a mouse;
    a touch operation on a touchscreen; or
    a keystroke operation on a keyboard.

11. An apparatus for obtaining a network service, applicable to an integrated development environment (IDE), wherein the IDE comprises a graphical interface comprising a toolbar and a plurality of functional areas, the plurality of functional areas comprise a code editing area for inputting and outputting source code, the toolbar comprises a first icon, and the apparatus comprises: one or more processors and one or more non-transitory computer-readable memories coupled to the one or more processors and configured with instructions executable by the one or more processors to cause the apparatus to perform operations comprising:
   receiving a user operation on the first icon in the toolbar;
   loading a browser engine;
   obtaining, through the browser engine, data from a local server, wherein the local server is started by the IDE and is capable of directly calling a function of the IDE, and the data comprises code from a user that specifies a list of websites;
   constructing, through the browser engine based on the obtained data, a web navigation interface comprising the list of websites; and
   displaying, through the browser engine, the web navigation interface in the code editing area of the graphical user interface (GUI) of the IDE, wherein the displaying comprises:
      constructing a new GUI on top of the code editing area by using a GUI library provided in the IDE, wherein the new GUI has a same display location as the code editing area and covers the code editing area; and
      displaying the web navigation interface in the new GUI.

12. The apparatus according to claim 11, wherein the toolbar comprises a second icon, and the operations further comprise:
   receiving a user operation on the second icon; and
   displaying or hiding the toolbar.

13. The apparatus according to claim 11, wherein the operations further comprise: enabling the user to construct another navigation interface and modify the another navigation interface in real-time.

14. The apparatus according to claim 11, wherein displaying or hiding the toolbar comprises:
   displaying the toolbar on top of, or to the left or right of the code editing area, and next to the code editing area.

15. The apparatus according to claim 11, wherein displaying or hiding the toolbar comprises:
   causing the toolbar to float within the code editing area.

16. The apparatus according to claim 11, wherein the toolbar comprises a plurality of first icons, for the user to obtain a plurality of network services through a plurality of navigation interfaces.

17. The apparatus according to claim 16, wherein the plurality of network services comprise:
   a local DingTalk service;
   a navigation and playing service of a video resource related to a current project;
   a download service for a development resource used in the current project;
   a service for publishing and uploading a code file of the current project to a server;
   a navigation service for a problem list and a forum that are related to the current project;
   a navigation service for a developer group related to the current project; or
   a combination thereof.

18. The apparatus according to claim 11, wherein the operations further comprise: customizing the first icon comprised in the toolbar and the network service corresponding to the first icon by using configuration information.

19. The apparatus according to claim 11, wherein the user operation on the first icon comprises:
   a click operation of a mouse;
   a touch operation on a touchscreen; or
   a keystroke operation on a keyboard.

20. A non-transitory computer-readable storage medium, applicable to an integrated development environment (IDE), wherein the IDE comprises a graphical interface comprising a toolbar and a plurality of functional areas, the plurality of functional areas comprise a code editing area for inputting and outputting source code, the toolbar comprises an icon, the non-transitory computer-readable storage medium configured with instructions executable by one or more processors to cause the one or more processors to perform operations comprising:
   receiving a user operation on the icon in the toolbar;
   loading a browser engine;
   obtaining, through the browser engine, data from a local server, wherein the local server is started by the IDE and is capable of directly calling a function of the IDE, and the data comprises code from a user that specifies a list of websites;
   constructing, through the browser engine based on the obtained data, a web navigation interface comprising the list of websites; and
   displaying, through the browser engine, the web navigation interface in the code editing area of the graphical user interface (GUI) of the IDE, wherein the displaying comprises:
      constructing a new GUI on top of the code editing area by using a GUI library provided in the IDE, wherein the new GUI has a same display location as the code editing area and covers the code editing area; and
      displaying the web navigation interface in the new GUI.

* * * * *